Dec. 23, 1924.
G. A. GILLEN
TOGGLE PIN
Filed May 10, 1923
1,520,123
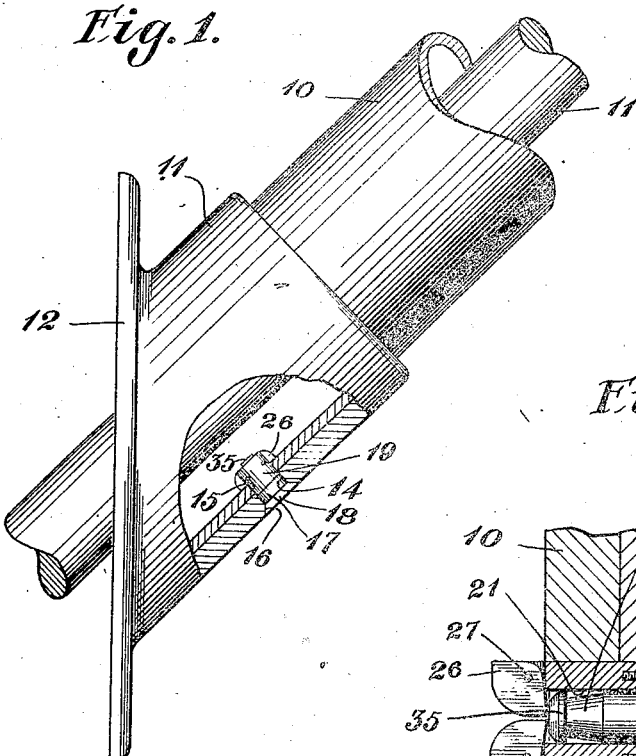
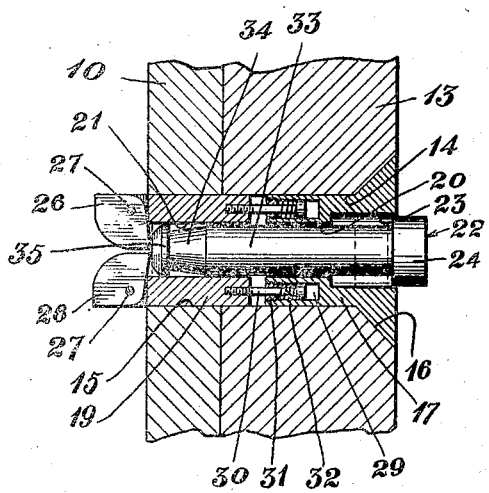
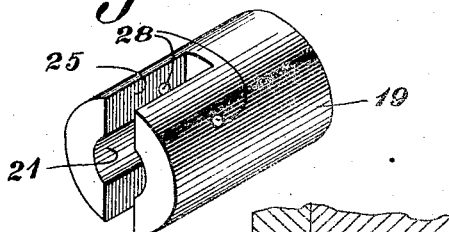
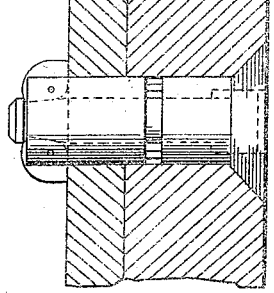
INVENTOR
George A. Gillen.
BY
ATTORNEY Patented Dec. 23, 1924.

1,520,123

UNITED STATES PATENT OFFICE.

GEORGE A. GILLEN, OF JERSEY CITY, NEW JERSEY, ASSIGNOR TO GILLEN, KIMMEY, BAKER SYNDICATE, INC., OF NEW YORK, N. Y., A CORPORATION OF NEW YORK.

TOGGLE PIN.

Application filed May 10, 1923. Serial No. 638,138.

*To all whom it may concern:*

Be it known that I, GEORGE A. GILLEN, a citizen of the United States, residing at Jersey City, in the county of Hudson and State of New Jersey, have invented new and useful Improvements in Toggle Pins, of which the following is a specification.

This invention relates to improvements in toggle pins, and has for its object to provide a device which, after once being inserted, cannot be removed without being destroyed.

Another object of the invention resides in the provision of a device so designed as to be extensible within limits, so as to enable the device to be used where varying thicknesses occur without requiring any variation in length.

A further object of the invention is to provide a device in which the springs used to hold the extensible parts together, also function to retain the locking pawls in engagement with the locking pins, thereby preventing the removal of the pin and consequent releasing of the pawls.

With the above and other objects in view, which will become more apparent as the description proceeds, the invention consists in the novel construction, combination and arrangement of parts which will be fully set forth in the following specification, claimed and illustrated in the accompanying drawing in which:—

Figure 1 is a fragmentary view partly in section of a steering column and cowl flange, showing this improved toggle pin in use, Figure 2, is an enlarged fragmentary sectional view of Figure 1, showing the toggle pin in section, and Figure 3, is a perspective view of the pawl carrying element.

Figure 4, is a view similar to Figure 2 showing the pin in locked position.

Referring to the drawings in detail, the numeral 10 designates a steering column housing the usual steering shaft 11 and fitted with the customary cowl flange 12, having the socket member 13 formed integral therewith. As shown the socket member 13 and the steering column are bored as at 14 and 15 respectively, and the socket member is counterbored as at 16 to receive the head of the toggle pin as clearly shown in the drawings.

The toggle pin comprises a cylindrical body 17 formed at one end with a head 18, and a cylindrical pawl carrying element 19. Both the body 17 and the pawl carrying element 19 are provided with aligning longitudinal bores 20 and 21 for the reception of the locking pin designated generically by the numeral 22. As shown the body 17 is counterbored as at 23 to receive the head 24 of the locking pin 22, and the pawl carrying element is slotted as at 25 to accommodate the locking pawls to be more fully hereinafter described.

The locking pawls above referred to are designated by the numeral 26 and are pivoted within the slot 25 on transversely extending pins 27, the ends of which are received in openings 28 formed in the pawl carrying element as shown in Figure 3.

Formed in the end of the body 17 opposite the head 18 are openings 29 which project in parallel relation to the bore 20, and slidably fitted in said openings 29 are the heads of pins 30 which are threaded into the inner end of the pawl carrying element 19. A collar 31 is threaded into the open end of each of the openings 29 and forms an abutment for the outer end of a compression coil spring 32 which normally holds the pawl carrying element 19 and body 17 in contact with each other.

The locking pin 22 previously mentioned comprises a cylindrical body 33 formed at one end with the head 24 and at its opposite end with a tapered portion 34 forming a flange 35.

In operation, the toggle pin is set into the openings 14 and 15 and the head 18 into the counter bore 16. The locking pin 22 is then inserted in the bores 20 and 21 so that the end carrying the flange 35 contacts with the inner edges of the pawls 26. Obviously when pressure is applied to the head 24, the pawls 26 and pawl carrying element 19 will be forced inwardly against the pressure springs 32 until the pawls pass out of the opening 15, at which time they will swing on their pivots 27 into the dotted line position shown in Figure 2, thus bringing their edges into contact with the inner side of the flange 35 and locking the whole device together. Obviously the pressure of the springs 32 will tend to pull the pawl carrying member into the opening 15 and consequently, the pawls will endeavor to fold inwardly so as to be brought and held into contact with the taper 34.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. A toggle pin comprising a body, a pawl carrying element yieldably connected thereto, a locking pin, and pawls associated with the pawl carrying element and adapted to be extended by the lockng pin.

2. A toggle pin comprising a body having a longitudinal passage therethrough, a pawl carrying element having a longitudinal passage aligning with the passage in the body, pawls associated with the pawl carrying element, means for adjustably connecting the body and pawl carrying element, and a locking pin adapted to be entered into the longitudinal passages to extend the pawls.

3. A toggle pin comprising a body, a pawl carrying element yieldably connected thereto, a locking pin, and pawls pivoted in the pawl carrying element and adapted to be moved into locking position by the locking pin.

4. A toggle pin comprising a body, a pawl carrying element, said body and pawl carrying elements being adjustably connected and each being provided with a longitudinal bore, pawls pivoted in the pawl carrying element, a locking pin adapted to enter the bores to engage and extend the pawls into locking position, and a retaining flange on the inner end of the pin to prevent its withdrawal.

5. A toggle pin comprising a body, a pawl carrying element, said body and pawl carrying elements each being provided with a longitudinal bore, pawls pivoted in the pawl carrying element, a locking pin adapted to enter the bores to engage and extend the pawls into locking position, yieldable means connecting the body and pawl carrying elements, a retaining flange on the inner end of the locking pin to prevent its withdrawal. and a head on the outer end of the locking pin to limit its inward movement.

Signed at New York city, in the county of New York and State of New York, this 4 day of May, 1923.

GEORGE A. GILLEN